April 10, 1945.   R. P. DAVIE, JR   2,373,385
ACTUATING MECHANISMS FOR AIRCRAFT COMPONENTS
Filed April 30, 1942   2 Sheets-Sheet 1

Robert P. Davie, Jr.
INVENTOR.
BY James M. Clark
His Patent Attorney

April 10, 1945.   R. P. DAVIE, JR   2,373,385
ACTUATING MECHANISMS FOR AIRCRAFT COMPONENTS
Filed April 30, 1942   2 Sheets-Sheet 2

Robert P. Davie, Jr.
INVENTOR.
BY *James M. Clark*
His Patent Attorney

Patented Apr. 10, 1945

2,373,385

UNITED STATES PATENT OFFICE 2,373,385

ACTUATING MECHANISM FOR AIRCRAFT COMPONENTS

Robert P. Davie, Jr., Manhattan Beach, Calif., assignor to North American Aviation, Inc., Inglewood, Calif., a corporation of Delaware Application April 30, 1942, Serial No. 441,088

9 Claims. (Cl. 244—102)

The present invention relates to actuating mechanisms and more particularly to improved hydraulic fluid motors for the actuation of aircraft components such as retractable landing gears, floats and the like.

In the design of retractable landing gears for aircraft, among the primary considerations are, that the landing gear structure be simple yet sturdy, that it address a minimum area to the airstream when it is in the operative or extended position and that it provide a well faired or completely housed position when retracted; and with respect to its retracting mechanism it is desirable that it be simple, compact, readily accessible for removal or repairs and that it be positive and foolproof in its operation.

The present invention resides in the novel relationship of a retractable landing gear strut with respect to its improved type fluid retracting mechanism for actuating the landing gear. While a number of fully cantilevered retractable landing gear structures have been proposed, and some have been used to a certain extent, they have been met with considerable difficulties both with respect to the provision of an adequate pivot capable of absorbing landing gear impacts as well as from the standpoint of a satisfactory arrangement of its actuating mechanism and the connection of the same to the supporting strut. While retractable landing gear practice has utilized fluid motors of some sort ever since retractable landing gears have met with general use, these actuating motors have invariably been of the piston-cylinder type. They have furthermore been most frequently used with landing gear struts which have been laterally braced or provided with drag struts and have substantially always been used with breaking link struts of a more or less complicated nature which presents considerable drag in the exposed position of the wheel and requires a large well in the wing or fuselage structure into which the landing gear strut assembly is retracted.

The present invention, which consists, in a preferred embodiment, of a cantilever shock absorber strut provided with a hollow pivotal bearing and a compact direct-acting fluid motor co-axially mounted within the pivot bearing, provides a simplified and sturdy arrangement which eliminates all of the above mentioned prior difficulties and objections.

It is accordingly a major object of the present invention to provide a retractable landing gear of the fully cantilevered type having an improved pivotal and structural mounting supported upon the aircraft structure. A further object of this invention lies in the provision of an improved actuating mechanism for retracting and extending the landing gear structure. It is also an object to provide an improved relationship between a cantilevered landing gear strut and its actuating motor, or mechanism, in which a minimum of exposed area is addressed to the airstream in the extended position of the landing wheel; and further, in which arrangement the actuating mechanism is mounted upon the upper terminal of the landing gear strut as an integral unit rotatable therewithin and fully housed within the aircraft structure.

It is a further object of the present invention to provide a landing gear arrangement of unusual simplicity and compactness, an arrangement which is both positive and foolproof in its operation and readily adaptable for locking in both its retracted and extended positions. It is a further object to provide a pivotal connection for a swingable wheel strut in which the actuating mechanism is co-axially mounted as a compact unit within the pivoting structure. A further object of this invention resides in an improved tubular pivotal bearing, the exterior surface of which serves as the rotational bearing and impact-taking surface when the landing gear is subjected to sudden loads and the internal surface of which is adapted to engage the actuating motor. A still further object contemplates an improved locking feature as well as a number of constructional details and features of an improved type.

Other advantages and objects of the present invention will become apparent to those skilled in the art after a reading of the present specification and the following drawings forming a part hereof.

Figure 1:
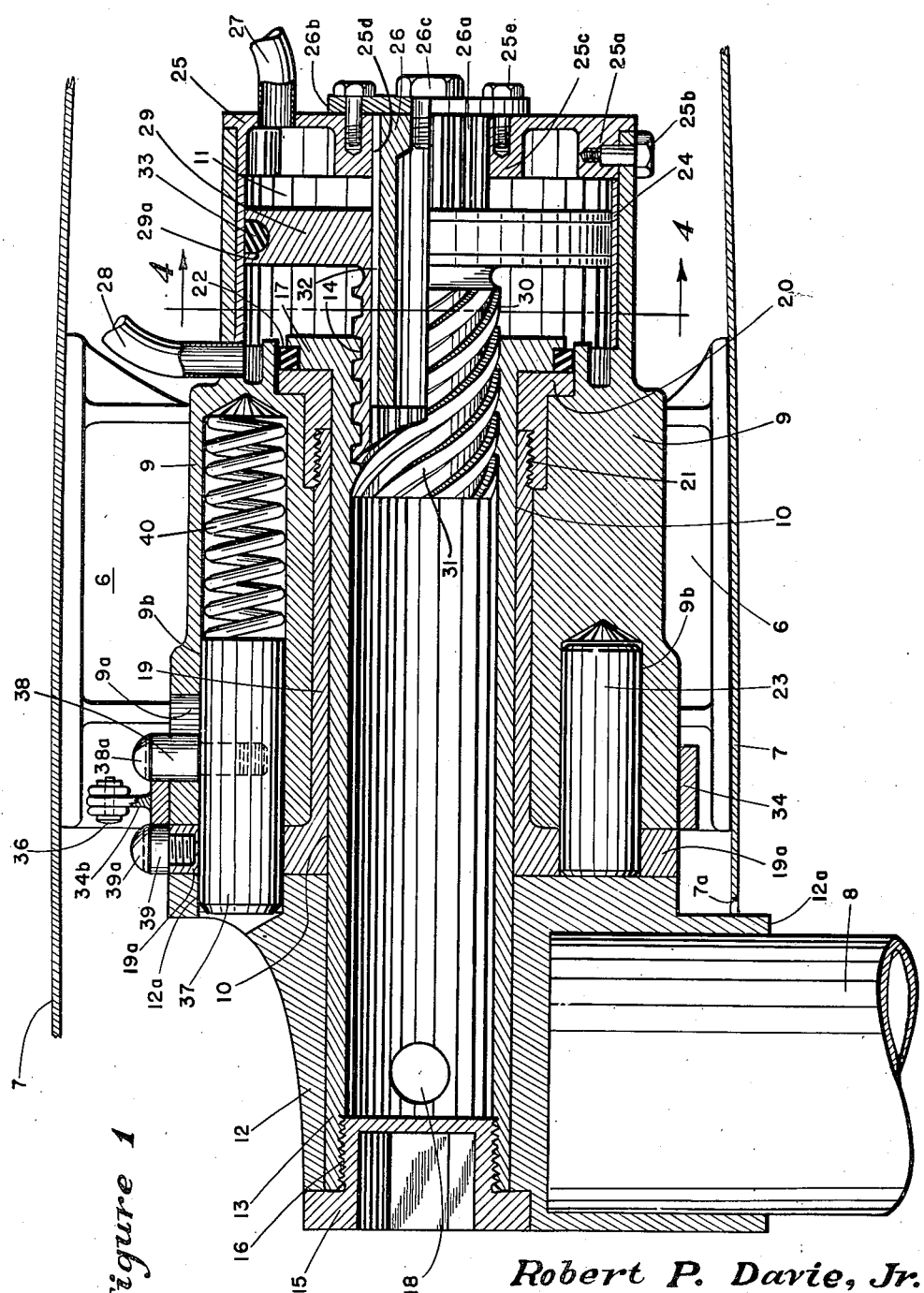
Fig. 1 is a detailed cross-sectional elevation of a preferred embodiment of my invention as applied to the upper terminal of a pivotally supported landing gear strut provided with my improved actuating mechanism housed within an aircraft wing.
Figure 2:
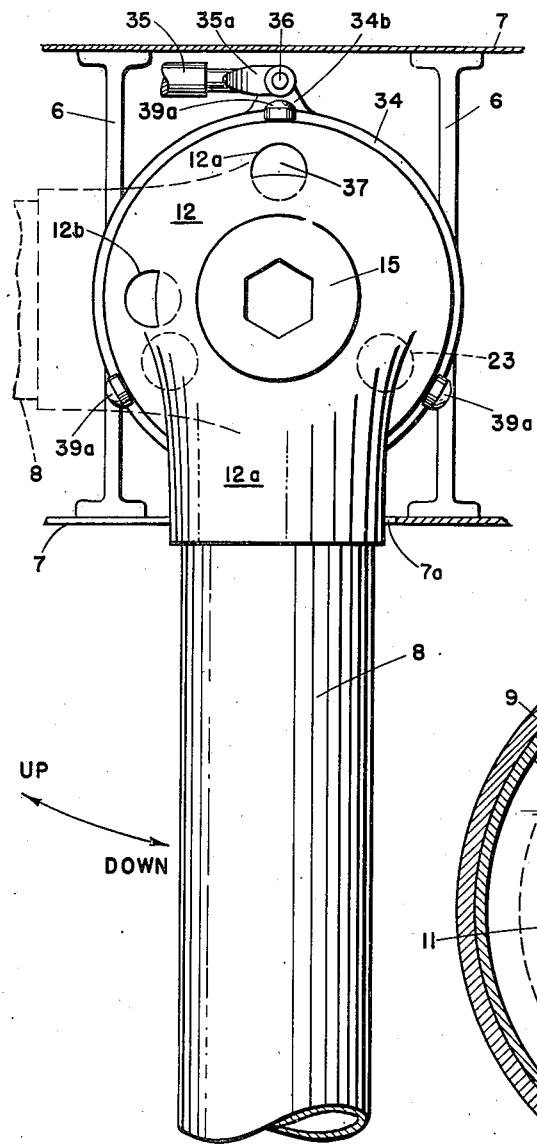
Fig. 2 is a front elevation of the same mechanism to a somewhat smaller scale.

Referring now to Figs. 1 and 2, the numeral 6 indicates a fitting within the aircraft wing strucure which has upper and lower skin surfaces or coverings 7. The upper element, or cylinder portion of an aircraft shock absorbing oleo strut, is indicated by the numeral 8, and is adapted to be rotated through 90 degrees between its retracted and extended positions through an opening 7a in the lower skin surface. The strut 8 is preferably provided with a lower or piston element from which a wheel or other ground engaging element is suitably carried, there being suitable torque arresting means interconnecting the telescoping elements of the piston-cylinder shock absorber portions in a manner well known in the art. A combined pivotal bearing for the landing gear strut 8, as well as a housing for its actuating mechanism, is provided by the cylindrical casing 9 which is fixedly attached to the aircraft structural fitting 6. The cylindrical casing 9 is preferably provided with a forwardly directed supporting portion of slightly larger diameter and relatively thicker wall than its rear or cylinder portion, within the forward portion of which there is provided a pivotal bearing surface 10. The rear portion of the casing 9 is of a slightly less diameter and wall thickness and is adapted to form a fluid cylinder 11.

The upper terminal of the landing gear strut 8 is rigidly supported within a strut fitting 12 which is provided with a downwardly extending hub portion 12a to which the strut 8 is suitably attached (by means which are not shown). Within the strut fitting 12 there is provided an elongated tubular sleeve 13, the outer surface of which is adapted to form the corresponding pivotal contact with the above mentioned bearing portion 10, and the inner end of the internal surface of which is suitably provided with helical splines or screw threads 14. The forward terminal of the pivotal sleeve 13 is provided with internal threads 16 which threadedly engage similar external threads on the outer retaining bushing 15 which is of the hexagonal socket type to permit its being readily removed. The inner end of the pivotal sleeve 13 for the strut fitting is provided with a radially extending flange portion 17 by which the sleeve is retained within the casing 9. A suitable assembly pin 18 is passed through the walls of the strut fitting 12 and that of the tubular sleeve 13 in order to fix the rotational relationship between these two elements and to simplify its reassembly in the event the parts are required to be disassembled for servicing or other reasons.

The forward or bearing portion of the cylinder casing 9 is also provided with a flanged bearing sleeve 19 which has a radially extending flanged portion 19a at its forward end. A flanged retainer bushing 20 serves to retain the liner or sleeve 19 within the casing 9 by engagement of the threads 21 internally cut into the retainer 20 and externally cut upon the sleeve 19. A suitable packing ring, of rubber composition or other suitable material, is provided at 22 to seal the contents of the cylinder portion 11 from the pivotal bearing surface 10, as well as the joint between the sleeve 19 and 20 and the inner bore of the casing 9. In order to prevent relative rotation of the flanged sleeve 19 with respect to the casing 9 there is provided one or more pins 23 serving to maintain the proper assembled relationship between the sleeve 19 and its supporting casing 9.

The rear, or cylinder portion of the casing 9 forming the fluid cylinder 11 is provided with an internal cylindrical liner 24 which is retained within the casing by the cylinder end fitting 25. The latter is peripherally recessed for the rearward edge of the casing 9 to which it is attached by the circumferentially disposed attachment screws 25b engaging tapped holes in the cylindrical flange 25a of the end fitting 25, against which flange the casing liner 24 abuts and is retained. The end plate 25 is provided with a hub portion 25c which is internally provided with longitudinally or axially extending female splines 25d. Within this splined hub 25c there is rigidly supported a fixed piston 26 which is provided on its exterior surface with similar but complementary axially extending male splines 26a which engage the above mentioned splines 25d. The piston 26 is attached to an end attachment plate 26b by means of the central attachment bolt 26c which engages internal threads in the hub portion of the piston element 26, the end plate or disc 26b being attached to the hub portion 25c of the cylinder end plate by means of the attachment screws 25e. The wall of the end plate 25 is provided with a suitable fluid conduit connection 27 to permit hydraulic fluid to enter or be discharged from the adjacent portion of the cylinder 11.

Within the cylinder portion 11 in the rear end of the casing 9 there is provided a translatable piston 29. This piston 29 is provided with an axially extending hub portion 30 which is provided on its external surface with helical splines or threads 31, and is provided within its internal central portion with a series of internal or female axial splines 32 which are adapted to slidably engage the external axial splines 26a provided on the fixed piston 26. The external helical splines 31 threadedly engage the helical splines 14 which are provided within the interior of the sleeve portion 13. The outer periphery of the piston 29 is provided with a circumferential groove 29a adapted to receive a rubber composition or other suitable packing ring 33 to prevent passage of fluid under pressure from one portion of the cylinder 11 to the other past the piston 29. The outer wall of the casing 9 forward of the piston 29 is provided with a suitable fluid conduit connection 28 to permit fluid to be either fed into the forward portion of the cylinder 11, or to be discharged therefrom. It will therefore be seen that the actuating portion of the mechanism comprises essentially a fixed splined piston axially engageable by a translatable piston which is exteriorly provided with helical threads such that translation of the movable piston 29 in an axial direction imparts rotation to the internally threaded sleeve element 13 with which this translatable piston is in threaded engagement.

Assuming now that with the mechanism in its unlocked condition hydraulic fluid under pressure is passed into the cylinder 11 through the connection 27 and is permitted to discharge through the conduit 28 from the other side of the piston 29, the latter is caused to move forwardly or to the left in Fig. 1. The piston is prevented from rotating within the casing 9 by the axial splines 32 and in moving forward imparts a clockwise rotation to the sleeve 13 and the attached landing gear strut 8, as viewed in Fig. 2, looking rearwardly, and the landing gear is accordingly retracted. Similarly, when the valves are controlled such that the fluid pressure enters through the conduit 28, causing the translatable piston 29 to move rearwardly and to cause discharge of the fluid from the cylinder 11 through the conduit 27, a counterclockwise rotation, as viewed in Fig. 2, is imparted to the strut 8 and its attached rotative elements, and the landing gear is accordingly extended into its operative position.

Figure 3:
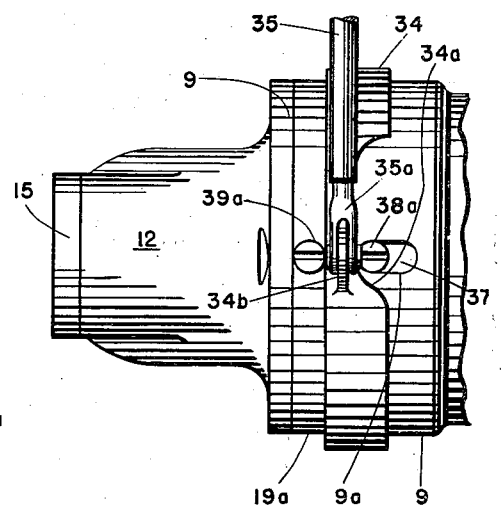
Fig. 3 is a plan view of that portion of the structure which is shown in Fig. 2.
Figure 4:
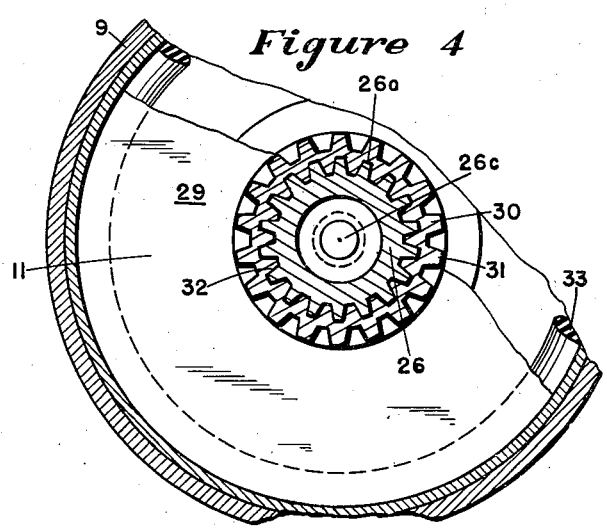
Fig. 4 is an enlarged detailed section taken along the lines 4—4 of the actuating mechanism shown in Fig. 1.

The upper portion of the bearing part of the casing 9 is provided with a longitudinally extending cylindrical hole or bore 9b within which a locking pin 37 is adapted to be slid, either under the influence of, or against the compression spring 40. Encircling this portion of the casing 9 is an annular cam ring 34 provided with a camming surface 34a, as may be seen in the plan view in Fig. 3. The cam ring is provided with an apertured lug 34b adjacent the cam slot 34a, and a reciprocal push-pull rod 35 having a clevis terminal fitting 35a is pivotally linked to the cam ring lug 34b by means of the pin 36. At the top of the adjacent portion of the casing 9 the latter is provided with a longitudinally extending slot 9a, within which the cam follower roller 38 and its stud 38a, by which it is attached to the locking pin 37, is adapted to freely slide under the influence of, or against the compression spring 40. The flanged portion 10a of the casing bearing sleeve 10 is provided with a plurality of radially disposed cam ring guide rollers 39 attached to the periphery of the flanged portion by means of the radially disposed roller studs or pins 39a. These rollers 39 bear against the straight forward edge of the cam ring 34 which is confined to its transverse rotational path around the casing 9 by the single longitudinally reciprocable roller 38 as it is pushed back into the slot 9a under the influence of the camming surface 34a, or as it is returned into the forward or locking position of the pin 37 under the influence of the compression spring 40. The movement of the push-pull rod 35 for releasing the locking pin 37, or permitting it to become locked under the influence of the spring 40, is preferably cooperatively arranged with the controls of the hydraulic valves controlling the flow of fluid under pressure into and from the fluid conduits 27 and 28.

The operation of the landing gear and its retracting mechanism is as follows: Assuming that the landing gear is in the extended or operative position as indicated in Figs. 1 and 2, and that it is also in the locked position as indicated by the cam lock ring and push rod as shown in the plan in Fig. 3. In order to retract the gear from this position, the valve controlling the hydraulic fluid pressure into the conduit 27 is opened and simultaneously with the opening of this valve, the push-pull rod 35 is drawn to the left in Fig. 2. This movement of the push-pull rod 35 causes the cam ring 34 to rotate in a counterclockwise direction, as viewed in Fig. 2, such that the full width of the cam ring is wedgingly forced between the rollers 39 and 38, causing the latter to be moved rearwardly together with its attached locking pin 37, until the roller 38 is located at the rear of the slot 9a. At the same instant fluid under pressure enters the cylinder portion 11 through the conduit 27 exerting pressure upon the rear face of the piston 29, causing forward translation of the piston along the engaging axially disposed splines 26a, the external helical splines 31 on the hub 30 of the translatable piston entering within the tubular sleeve 13 along the female helical splines 14 thereof. As the splines 31 of the piston hub engage the splines 14 within the tubular sleeve 13, a clockwise rotation is imparted to the sleeve 13 as viewed looking rearwardly in Fig. 2. Similarly, as the longitudinal opening 12b within the shock strut fitting 12 at the left of Fig. 2, rotates through 90 degrees in a clockwise direction where it becomes alined with the pin 37, the latter which has now again come under the influence of the spring 40 by virtue of the push-pull rod 35 having been returned to its position shown in Fig. 3, enters the cylindrical aperture 12b and serves to lock the landing gear in its retracted position. In addition a conventional type latch directly engaging the oleo strut 8 is also preferably provided to automatically latch the gear in its retracted position. While this secondary lock is not shown in the drawings, it is of a conventional type which is well understood by those acquainted with the art.

Other forms and modifications of the present invention both with respect to its general arrangement and the detailed features of its component parts are all intended to come within the scope and spirit of the present invention as more particularly defined in the appended claims.

I claim:

1. In a landing gear retracting mechanism, a tubular element fixedly attached to the landing gear structure, said tubular element provided interiorly with helical splines, a cylindrical casing member rigidly supported from the aircraft structure adapted to form a pivotal support for said tubular element, said casing member having a fluid cylinder portion, a piston element fixedly carried by said casing member extending axially into said cylinder portion, a translatable piston mounted upon said fixed piston for axial movement therealong, means cooperatively associated with said fixed and translatable pistons to prevent relative movement therebetween, said translatable piston having an axially extended hub portion, helical splines carried upon the exterior of said translatable piston hub portion adapted to engage said splines within said tubular element and fluid pressure means to impart axial movement to said translatable piston for retracting and extending movements of said tubular element and its attached landing gear structure.

2. In a landing gear retracting mechanism, a tubular element fixedly attached to the landing gear structure, said tubular element provided interiorly with helical splines, a cylindrical casing member rigidly supported from the aircraft structure adapted to form a pivotal support for said tubular element, said casing member having a fluid cylinder portion, a piston element fixedly carried by said casing member extending axially into said cylinder portion, a translatable piston mounted upon said fixed piston for axial movement therealong, means cooperatively associated with said fixed and translatable pistons to prevent relative movement therebetween, said translatable piston having an axially extended hub portion, helical splines carried upon the exterior of said translatable piston hub portion adapted to engage said helical splines within said tubular element, fluid means to impart axial movement to said translatable piston for rotational movements of said tubular element and retraction and extension of its attached landing gear structure and mechanical locking means simultaneously operable with said fluid means for unlocking the said tubular element from said casing member.

3. In a retractable aircraft landing gear, a wheel-carrying strut, a hollow pivotal element fixedly attached to said strut, a casing member fixedly attached to the aircraft structure having an internal bore adapted to provide a journal for said hollow pivotal element, a fluid cylinder portion within said casing member in axial alinement with said tubular pivot element, a fixed piston axially disposed within said fluid cylinder portion, an axially movable piston disposed within said cylinder portion, means associated with said fixed and movable piston adapted to confine movement of the latter to axial movements and prevent relative rotational movements thereof, and helical means externally carried by said movable piston engageable with cooperating helical means internally carried by said tubular pivot element adapted to impart rotational movements thereto upon relative axial movements of said movable piston for the retraction of said landing gear.

4. Means for obtaining relative movements between fixed and movable aircraft parts including a reversible fluid piston motor having a portion fixed to the aircraft adapted to effect a pivotal connection for the movable aircraft part, the piston of said fluid motor having internally splined means engageable with said fixed portion to permit sliding but to prevent rotative movements with respect thereto, and helical means on said sliding piston and said movable aircraft part to effect a relative rotational movement thereto upon axial movement of said piston within said fixed portion.

5. A retractable landing gear for aircraft comprising a cantilevered wheel-carrying strut, pivot means fixedly attached to an upper portion of said strut, the said pivot means being provided with internal helical splines, a support member fixedly attached to said aircraft adapted to provide a journal for said pivot means, a translatable piston axially movable within said support member provided with external helical splines engaging the said helical splines of said pivot means, rotation restraining means fixed to said support member slidably engageable with a centrally bored portion of said piston whereby rotational movement is imparted to said pivot means upon relative axial movement of said piston with respect to said support member for the retraction of said landing gear.

6. A retractable landing gear for aircraft comprising a cantilevered wheel-carrying strut, a tubular pivot member fixedly attached to an upper portion of said strut, the said tubular member being provided with internal helical splines, a tubular support member fixedly attached to said aircraft adapted to provide a journal for said tubular pivot means, said support member having a fluid chamber portion, a fluid piston axially movable within said support member, piston rotation prevention means carried by said support member slidingly engageable with an axially disposed opening in said piston, said piston provided with an external helically splined portion engaging the said internal helical splines of said pivot means adapted to impart rotational movement thereto upon said relative axial movement, and means to fix the rotational relationship between said pivotal means and said support member at predetermined positions for locking said strut in its retracted and extended positions.

7. A retractable aircraft landing gear comprising a ground-engaging strut, a rotatable tubular element attached to said strut and adapted to serve as its rotational pivot between retracted and extended positions, said tubular element being rotationally supported within the aircraft structure, an externally threaded actuating element having an internal bore axially movable with respect to said tubular element, threads internally formed within said tubular element adapted to engage the said external threads of said actuating element, rotation restraining means fixed with respect to said aircraft structure slidingly engageable with said internally bored portion of said actuating element adapted to prevent its rotation about said axis while permitting said axial movement and power means for selectively controlled axial movements of said actuating element for the rotation of said tubular element and the retraction and extension of the landing gear.

8. In a cantilevered retractable landing gear strut having an angularly disposed internally threaded pivot portion, the combination of a combined actuating and support member including a fixed casing adapted to provide both a fluid cylinder and a journal for said strut pivot portion and fluid motor means having a centrally bored portion disposed for axial movement within said cylinder, said motor means having a threaded portion engageable with said threaded pivot portion, and rotation restraining means fixed to said casing slidingly engageable with said centrally bored portion of said fluid motor means whereby rotation of said strut pivot portion is obtained upon axial movement of said fluid motor means.

9. In a pivot mounting for a cantilevered landing gear strut, a support member fixedly attached to the aircraft, a threaded pivot member fixedly attached to the landing gear and rotatably supported by said support member, fluid actuating means housed within said support member having a threaded portion engageable with the threads of said pivot member, said actuating means having a centrally bored portion and piston rotation restraining means fixed to said support member slidably engageable with said centrally bored portion of said fluid actuating means whereby rotation of said pivot member is derived upon axial movement of said fluid actuating means with respect to said support member for the pivotal movement of said strut.

ROBERT P. DAVIE, Jr.